United States Patent

[11] 3,599,478

[72] Inventor Hillel Weinbaum
Houston, Tex.
[21] Appl. No. 780,663
[22] Filed Dec. 3, 1968
[45] Patented Aug. 17, 1971
[73] Assignee AMF Incorporated

[54] SELF-CALIBRATING ULTRASONIC THICKNESS-MEASURING APPARATUS
3 Claims, 2 Drawing Figs.

[52] U.S. Cl. .................................................. 73/67.7, 73/67.9
[51] Int. Cl. ...................................................... G01n 29/04, G01b 17/02
[50] Field of Search ............................................. 73/67.7-—67.9

[56] References Cited
UNITED STATES PATENTS
3,164,007 1/1965 Stebbins et al. ............... 73/67.9
3,228,232 1/1966 Proctor ......................... 73/67.7
3,485,087 12/1969 Brech ........................... 73/67.7

OTHER REFERENCES
Curtis-Wright, K-H Two Channel Flaw Alarm, Publication of Curtis-Wright Corp., CS 106-000 received June 1961.

*Primary Examiner*—Richard C. Queisser
*Assistant Examiner*—John P. Beauchamp
*Attorneys*—George W. Price and John H. Gallagher ABSTRACT: Pulsed ultrasonic thickness-measuring apparatus utilizing three ultrasonic transducers equally spaced from the adjacent surface of an object whose thickness is to be measured. Two transducers function as conventional transmitter and receiver to direct pulses of ultrasonic energy into the object and receive energy reflected from the far surface of the object or from a defect within the object. The third transducer is a transceiver that directs pulses of ultrasonic energy onto the adjacent surface of the object and receives reflections therefrom. A reflection received by the third transducers commences a time measuring operation indicating thickness of the object, or location of defect, as measured by the first two transducers. Use of a third transducer eliminates from timing operation the transit time of ultrasonic energy from transmitter transducer to adjacent surface, and from said surface to receiver transducer, thereby providing a measure only of thickness of object.

INVENTOR.
HILLEL WEINBAUM
BY John H. Gallagher
ATTORNEY

SELF-CALIBRATING ULTRASONIC THICKNESS-MEASURING APPARATUS

BACKGROUND OF THE INVENTION

Many different types of ultrasonic devices are known for measuring the wall thickness of objects such as pipes whose two surfaces are not readily accessible to the equipment which is located proximate one surface. This type of equipment also commonly is used to determine the presence and location of structural defects in the wall or body of the object being inspected. A compact and reliable instrument of this type is disclosed and claimed in U.S. Pat. application Ser. No. 598,774, entitled "Ultrasonic Thickness Measuring Apparatus," filed Dec. 2, 1966 by the present applicant. This apparatus utilizes a transmitter transducer to direct pulses of ultrasonic energy into the wall of the object, a pipe for example, being tested and employs a receiver transducer to receive pulses reflected from the far surface of the wall. In that application, timing measurements for determining the thickness of the wall are made with reference to the occurrence of a clock pulse from a clock pulse source which also actuates the transmitter transducer. The actual timing operation is commenced a fixed time interval after the occurrence of the clock pulse to account for the transit time of the ultrasonic energy from the transmitter transducer to the adjacent surface of the object and from that surface to the receiver transducer, the transducers being slightly spaced from the adjacent surface. This technique is accurate if the transducers always are spaced the same distance from the adjacent surface of the object being inspected. However, when the objects being inspected are pipes and tubing used in the oil, gas and petrochemical industries, and particularly if the pipes are used pipes, the surfaces often have scale, rust, and other foreign matter thereon and the transducers are not always positioned the same distance from the actual surface of the pipe. Additionally a coupling medium such as a fluid or a grease often is used between the transducers and the surface of the object being tested to provide an improved impedance match between the transducers and the object, thereby to improve the coupling of the ultrasonic energy into and out of the object. Obviously, the thickness of this coupling medium cannot be maintained constant, particularly when operating the equipment in the field and when the transducers are within a hand-held mounting head which is placed on the pipe surface by an operator. It is believed obvious that the system described in applicant's above-identified pending application is susceptible to some inaccuracy since it has a fixed although manually adjustable, time delay built into its timing system while the actual transit times of the ultrasonic energy to and from the adjacent surface of the object being inspected is subject to variation.

SUMMARY OF THE INVENTION

In the present invention the possible inaccuracies inherent in the above-described system are substantially eliminated by eliminating the fixed time delay feature. In this invention, a third ultrasonic transducer, operating as a transceiver is pulsed by the same clock pulses that pulse the transmitter transceiver, and receives energy reflected directly from the adjacent surface of the object such as a pipe whose wall thickness is being measured. The received pulse from this third transducer commences the time measuring operation at such a time as to substantially eliminate from the final time measurement, which indicates pipe wall thickness, the transit time of the ultrasonic energy from the transmitter transducer to the adjacent surface and from that surface to the receiver transducer.

DETAILED DESCRIPTION OF THE INVENTION

Figure 1:
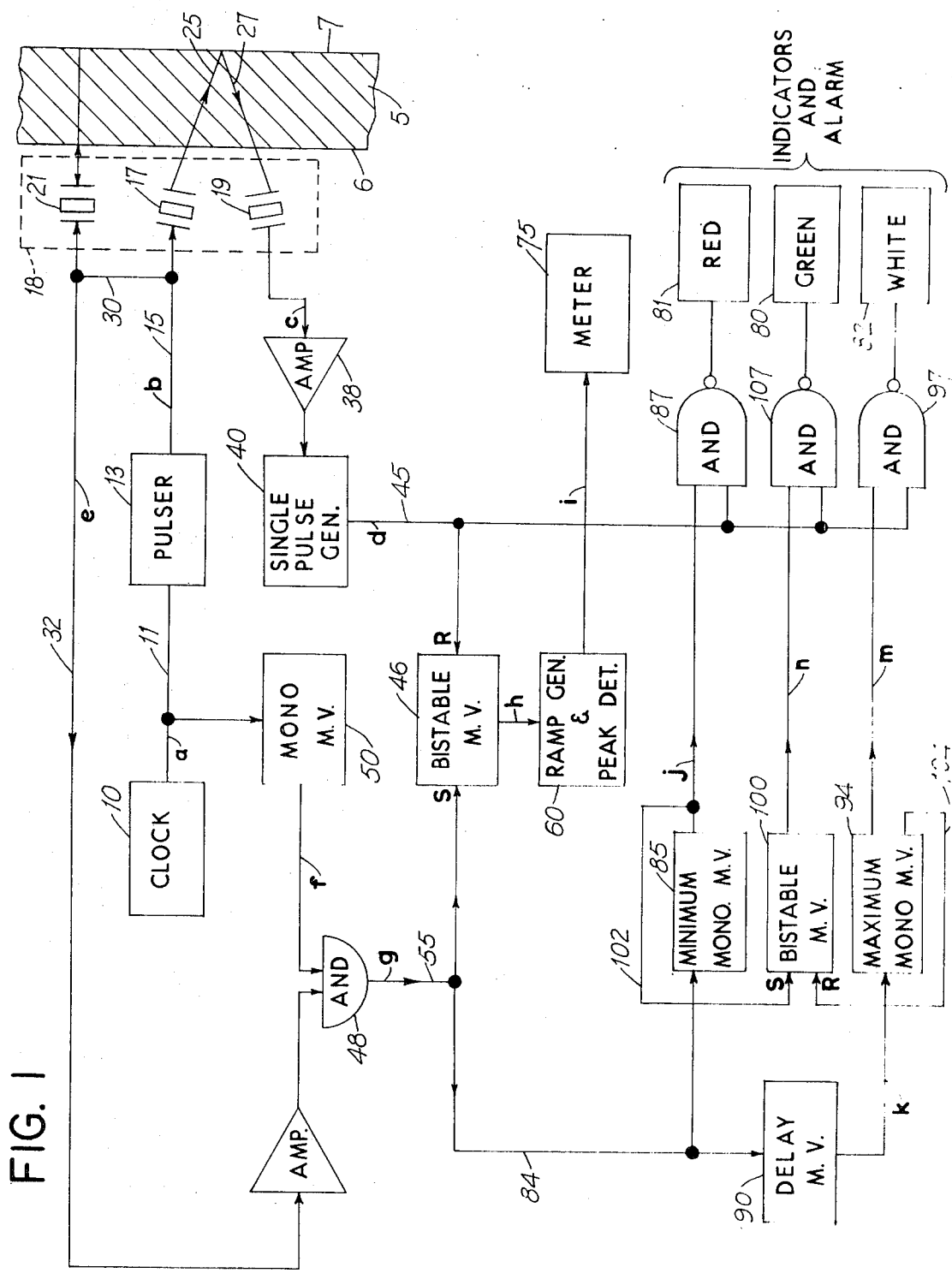
FIG. 1 is a simplified block diagram illustrating the ultrasonic thickness-measuring system of this invention.

Referring in detail to the drawings, the object 5 whose thickness is to be measured will be assumed in this description to be the wall of a steel pipe, although it could just as well be a metal bar, rod, plate or some other object. The surface 6 of the wall would be the outside surface of the pipe which is accessible for measurement, and surface 7 would be the inside surface which is inaccessible throughout most of the length of the pipe. In the following description, surfaces 6 and 7 will be referred to as adjacent and far surfaces, respectively. Furthermore, it will be assumed that it is desired only to measure the wall thickness of the object 5. It is obvious that the presence and location of internal structural defects in the wall also may be determined with the apparatus of this invention.

A clock pulse source 10 produces regularly recurring electrical pulses, FIG. 2a, which are coupled over lead 11 to a pulser, or modulator, 13. Pulser 13 operates in response to input clock pulses to produce corresponding output pulses, FIG. 2b, of greater amplitude which are coupled over lead 15 to a transmitter ultrasonic transducer 17 that is located within a mounting head 18 which in practice might be a small cylindrical member that is hand-held by the operator of the apparatus. Also located within mounting head 18 is a receiver ultrasonic transducer 19, and a third ultrasonic transducer 21 which functions as a transceiver transducer, as will be explained. Preferably, all three transducers are positioned within mounting head 18 so that their faces closest surface 6 are substantially equally spaced therefrom when mounting head 18 is properly positioned on surface 6.

Transmitter and receiver transducers 17 and 19 have their respective transmitting and receiving surfaces slightly inclined with respect to the adjacent surface 6 of object 5. Transducers 17 and 19 may be known types of piezoelectric crystals that are constructed and arranged to transmit and receive, respectively, a relatively narrow directed beam of ultrasonic energy that propagates along the illustrated path comprised of path segments 25 and 27. In accordance with the present invention, it is desired that there be substantially no reflection of transmitted ultrasonic energy from the adjacent surface 6 directly back to receiver transducer 19. Design techniques for substantially assuring this type of operation are well known to those skilled in the art, and as one example in which the faces of transducers 17 and 19 both were less than 0.070 inch from adjacent surface 6, an angle of approximately 175° between those faces produced the desired type of operation.

Electrical pulses from pulser 13, FIG. 2b, also are coupled over lead 30 to pulse or modulate transceive transducer 21 in time coincidence with the pulsing of transmitter transducer 17. Transducer 21 may be similar in construction to transducers 17 and 19 but it is arranged with its face substantially parallel to adjacent surface 6 so that the beam path of ultrasonic energy transmitted therefrom is substantially normal to surface 6, whereby ultrasonic energy will be reflected from surface 6 directly back to transducer 21 which then functions as a receiver transducer to produce corresponding electrical signals on lead 32.

After transmitter transducer 17 is pulsed by pulse 34 of FIG. 2b, for example, the corresponding pulse of ultrasonic energy follows path segment 25 to the far surface 7 of object 5, is reflected therefrom, and follows path segment 27 to receive transducer 19 which responds thereto to produce the electrical pulse 36, FIG. 2c, which is amplified in amplifier 38 and coupled to single pulse generator 40.

It is seen in FIG. 2c that additional pulses appear following pulse 36 and that those following pulses successively decrease in magnitude. Those following pulses arise from successive reflections of ultrasonic energy which is "trapped" within object 5 between adjacent and far surfaces 6 and 7, as is well understood by those skilled in the art. Only pulse 36 out of the group is desired for subsequent operation of the system. Succeeding pulses are eliminated by single pulse generator 40 which produces a single pulse output, FIG. 2d, in response to pulse 36 of FIG. 2c. Pulse generator 40 is completely nonresponsive to the succeeding pulses of a group of pulses illustrated in FIG. 2c. Single pulse generator 40 may take any number of different forms, but one suitable circuit arrangement is comprised of two monostable multivibrators connected in tandem. The first one has a long unstable state which is longer than the duration of one group of pulses of FIG. 2c. Consequently, pulse 36 would cause the multivibrator to change from its stable to its unstable state but it would not be further affected by the succeeding pulses of that group. The second multivibrator has a short time constant so as to produce the desired output pulse 41 of FIG. 2d when triggered by the initial change of state of the first multivibrator. Devices operating in this manner are commercially available from Fairchild Semiconductor Corp., under the numerical designation "9601."

The single pulse output of pulse generator 40, FIG. 2d, is coupled from lead 45 to the reset input of bistable multivibrator 46. The set input to multivibrator 46 now will be described.

After transceive transducer 21 is pulsed simultaneously with transmit transducer 17 by pulse 34 of FIG. 2b, it receives directly back the ultrasonic energy reflected from adjacent surface 6. The corresponding transducer electrical signals appear on lead 32 as the waveform of FIG. 2e, and after amplification, are coupled to one input terminal of AND gate 48. The other input to AND gate 48 is the waveform of FIG. 2f produced by monostable multivibrator 50 which is triggered by the clock pulse of FIG. 2a from clock source 10. The negative pulse 51 of FIG. 2f, which commences at the occurrence of the clock pulse, acts as an inhibit pulse to keep AND gate 48 closed until after the clock pulse, and any associated transients, are terminated. Waveform 2f then rises to its more positive level and conditions AND gate 48 to pass the pulse 53 on line 32 which is connected to transceive transducer 21. The output of AND gate 48 is the pulse 54 of FIG. 2g which appears on lead 55 and which is coupled to the set input terminal of bistable multivibrator 46.

It is desired that only the pulse 53 of FIG. 2e be passed by AND gate 48, and if necessary, a single pulse generator similar to pulse generator 40 may be included in the connection between transducer 21 and AND gate 48.

Pulse 54, FIG. 2g, when coupled to the set input of bistable multivibrator 46 triggers it to its second stable state, FIG. 2h, and the first pulse received thereafter on its reset input terminal, pulse 41, FIG. 2d, resets it to its first stable state, whereby the output of bistable multivibrator 46 is the timing pulse 58 of FIG. 2h.

The time duration of timing pulse 58 is substantially equal to the transit time of an ultrasonic energy pulse from transducer 17 as it propagates from adjacent surface 6 to far surface 7 along path segment 25, and from far surface 7 back to adjacent surface 6 along path segment 27. Consequently, the duration of timing pulse 58 is a direct measurement, in time, of the thickness of member 5. This is true because timing pulse 58 does not commence until after the ultrasonic energy from transceiver 21 has propagated to and from the adjacent surface 6 of object 5. That propagation time is substantially equal to the transit time of ultrasonic energy from transmit transducer 17 to surface 6 along path segment 25, and from surface 6 to receive transducer 19 along path segment 27. Therefore, the propagation time that transpires while the ultrasonic energy is outside object 5 is not included in the time measuring interval represented by timing pulse 58.

To provide a suitable readout of timing pulse 58, the output of bistable multivibrator 46 is coupled to the input of ramp generator and peak detector circuit 60 which is well known circuitry which, in the first instance, functions in response to timing pulse 58 to produce a linearly rising output signal which commences upon receipt of the leading edge of pulse 58 and terminates its linear rise at the occurrence of the trailing edge of pulse 58, as illustrated in FIG. 2i. The peak detector portion of the circuit will maintain the peak voltage of the linear rise of the ramp-type output of the ramp generator.

Therefore, the amplitude 62 is a measure of the thickness of object 5. Suitable means (not illustrated) are provided to reset the ramp generator and peak detector circuit 60 when required. This may be accomplished by suitable circuitry operating in response to the output of AND gate 48, as by the next pulse 71 of FIG. 2g, for example. Reset circuits are commonly used in the art and their construction as required herein is well within the skill of one familiar with the art.

Figure 2:
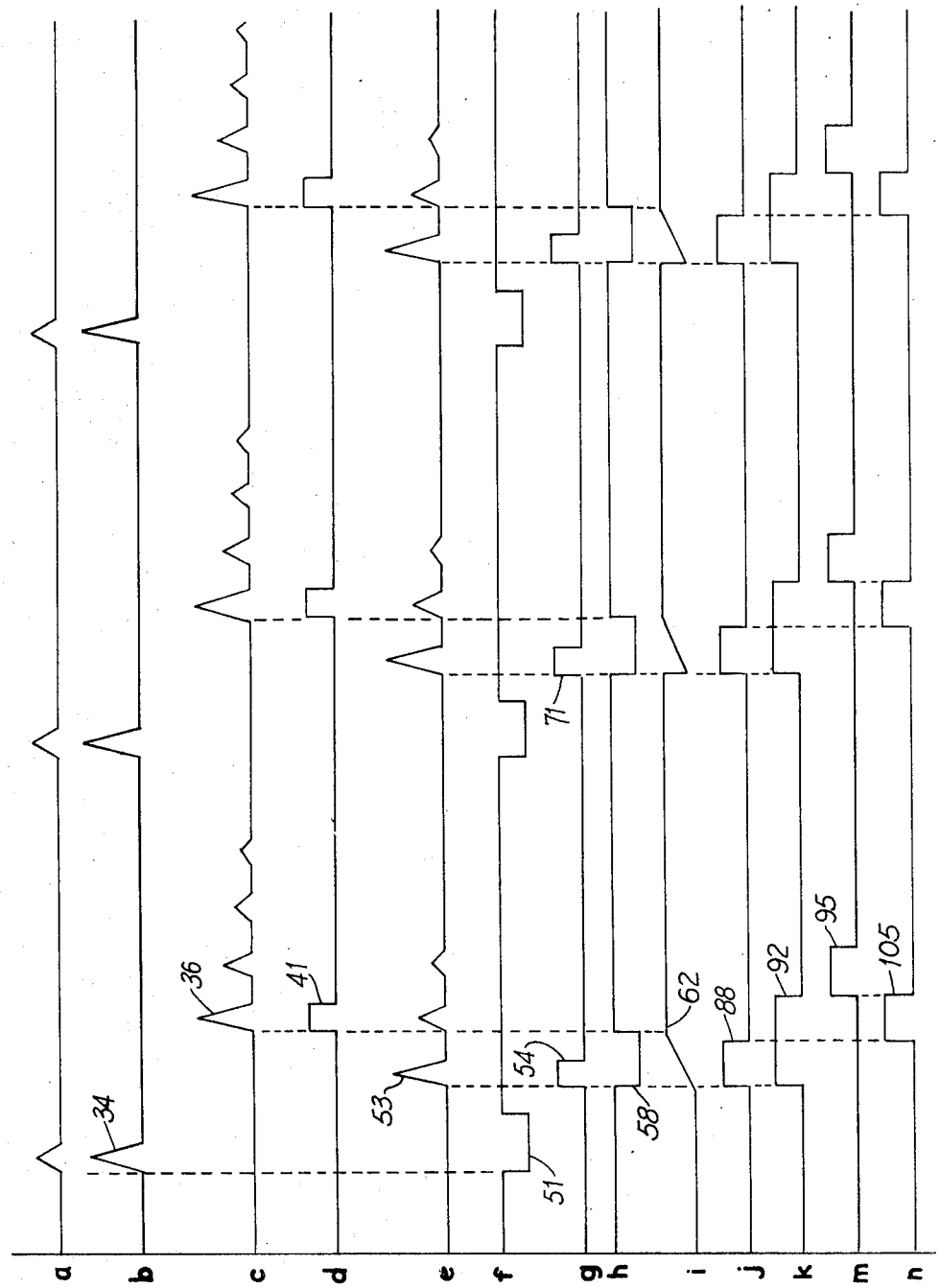
FIG. 2 is a series of waveforms referred to in describing the operation of the system in FIG. 1.

The output of ramp generator and peak detector 60 is coupled to a suitable thickness indicating instrument such as a meter 75 which is calibrated to indicate thickness in units of linear measurement. The timing relationships represented in FIG. 2 are not to actual scale, for purpose of convenience of illustration, and the ramp portion of the waveform of FIG. 2i will in practice represent but a short time interval in the time interval between clock pulses of FIG. 2a, and will therefore not adversely affect the meter reading.

In the inspection of pipe it is desirable to have an immediate indication of whether or not the measured wall thickness is within acceptable limits. Circuitry that will automatically provide this indication is shown in the bottom portion of FIG. 1. This circuitry causes green light 80 to light when the measured wall thickness is within acceptable limits, causes red light 81 to light when the measured wall thickness is below the minimum acceptable limit, and causes white light 82 to light when the measured wall thickness is greater than the maximum acceptable limit.

The output of AND gate 48, FIG. 2g, which will occur prior to the receipt by receive transducer 19 of a pulse reflected from far surface 7, is coupled over lead 84 to the input of minimum monostable multivibrator 85. Upon the occurrence of the leading edge of pulse 54, FIG. 2g, minimum monostable multivibrator 85 is triggered to its unstable state, FIG. 2j, and remains in that state for a time period that terminates at the time a reflected pulse would be received by receive transducer 19 if the pipe wall were of minimum acceptable thickness. The output of multivibrator 85, FIG. 2j, is coupled to one input terminal of AND gate 87 and the output from single pulse generator 40, FIG. 2d, is coupled to the other input terminal of AND gate 87. If a pulser from pulse generator 40 appears at AND gate 87 coincidentally with the pulse 88 of FIG. 2j, it will pass through AND gate 87 and will cause red light 81 to light, thus indicating that the measured wall thickness is below the minimum acceptable thickness.

The output of AND gate 48 also is coupled over lead 84 to a delay monostable multivibrator 90 which is triggered by the leading edge of pulse 54, FIG. 2g, to its unstable state, FIG. 2k, which persists for a time sufficient to permit it to return to its stable state when receive transducer 19 would receive a reflected pulse from the far surface of an object whose thickness was the maximum acceptable thickness, this corresponding to the trailing edge of pulse 92, FIG. 2k. The output of delay multivibrator 90 is coupled to the input of maximum monostable multivibrator 94 which responds to the trailing edge of pulse 92 to change to its unstable state, FIG. 2m, for a time interval represented by pulse 95, this time interval occurring beyond the time that a reflection would be received by transducer 19 from the far surface of a pipe whose wall thickness is within limits. The output of maximum monostable multivibrator 94 is coupled to one input of AND gate 97 and enables that gate to pass a pulse from single pulse generator 40 only during the occurrence of pulse 95. Any such pulse passed by AND gate 97 will light white light 82 and indicate that the wall thickness is too great.

Bistable multivibrator 100 is triggered to its second stable state, FIG. 2n, by the trailing edge of pulse 88, FIG. 2j, coupled to its set input terminal over lead 102 connected to the output of minimum multivibrator 85. Bistable multivibrator 100 is reset to its first stable state by the leading edge of pulse 95, FIG. 2m, coupled to its reset terminal over lead 104 from the output of maximum multivibrator 94. Because the trailing edge of pulse 88 defines the minimum acceptable wall thickness and the leading edge of pulse 95 defines the maximum acceptable wall thickness, the pulse 105 of FIG. 2n occurs only during the time that receive transducer 19 would receive a reflection from a far surface 7 of an object whose thickness is within acceptable limits.

The output of bistable multivibrator 100 is coupled to AND gate 107 and will enable that gate to pass pulses when the thickness of object 5 is within limits, thereby lighting green light 80.

Other types of circuitry can be built to perform the same tolerance indications as just described.

From the above description it is believed to be apparent that the resulting thickness measurement is extremely accurate because the circuitry, in effect, measures time only during the interval that the ultrasonic energy is propagating within the object. Consequently, no error can arise in the measurement because of variations or imprecision in the spacing of the transducers from the adjacent surface of the object being inspected.

What I claim is:

1. Ultrasonic-measuring apparatus for inspecting an object having an adjacent surface and a far surface which reflects ultrasonic energy, comprising first and second ultrasonic transducers disposed proximate said adjacent surface and each angularly oriented thereto for transmitting ultrasonic energy from the first transducer and through said adjacent surface with substantially no reflection from the adjacent surface back to the second transducer when the transmitted ultrasonic energy is obliquely oriented at a desired angle to said adjacent surface, the second transducer receiving ultrasonic energy reflected from said far surface or reflected from a defect between said surfaces of the object and propagated back through said object and out of the adjacent surface, a third ultrasonic transducer disposed proximate said adjacent surface and proximate said first and second transducers for transmitting ultrasonic energy substantially normally onto the adjacent surface to provide ultrasonic energy reflected directly from the adjacent surface, said directly reflected energy being received by the third transducer but not by the second transducer, said first and third transducers being substantially equally spaced from the adjacent surface, means for energizing said g, and third transducers in substantial time coincidence, whereby they transmit ultrasonic energy in substantial time coincidence, an electrical bistable device which may be transferred between first and second stable states by respective signals applied thereto, means for coupling said third ultrasonic transducer to said bistable device to transfer said device to its first stable state upon the receipt by said third transducer of a direct reflection of its ultrasonic energy from the adjacent surface, means for coupling said second ultrasonic transducer to said bistable device to transfer said device to its second stable state upon the receipt by said second transducer of a reflection of ultrasonic energy from the far surface of the object or from a defect between the surfaces of the object, and means for providing an indication of the time interval the bistable device is in its first stable state.

2. The combination claimed in claim 1, wherein said means for energizing said first and third transducers substantially in time coincidence includes a common source of electrical signals.

3. The combination claimed in claim 2, wherein said source is a source of recurring pulses.